United States Patent [19]

Masuda et al.

[11] Patent Number: 5,166,807
[45] Date of Patent: Nov. 24, 1992

[54] APPARATUS FOR RECORDING AND REPRODUCING CODE DATA FOR USE IN VIDEO DISC RECORDER

[75] Inventors: Wataru Masuda, Katano; Yasunobu Matsuo, Ibaraki; Yuko Yamahara, Osaka, all of Japan

[73] Assignee: Matsushita Electric Industrial Co., Ltd., Osaka, Japan

[21] Appl. No.: 724,474

[22] Filed: Jun. 27, 1991

Related U.S. Application Data

[62] Division of Ser. No. 276,852, Nov. 28, 1988, abandoned.

[30] Foreign Application Priority Data

Nov. 27, 1987 [JP] Japan ................. 62-300827

[51] Int. Cl.$^5$ .............................. H04N 5/92
[52] U.S. Cl. .................................. 358/342
[58] Field of Search ............. 359/59, 116, 109, 124; 358/342; 346/76 L; 360/33.1, 32, 27

[56] References Cited

U.S. PATENT DOCUMENTS

| 3,931,460 | 1/1976 | Watson | 369/44.39 |
| 4,086,634 | 4/1978 | Cook | 360/27 |
| 4,190,843 | 2/1980 | Spong | 369/116 |
| 4,525,822 | 6/1985 | Nishimura | 369/124 |
| 4,706,235 | 11/1987 | Melbye | 369/59 |
| 4,706,236 | 11/1987 | Yoda | 369/59 |
| 4,785,443 | 11/1988 | Minami et al. | 369/116 |
| 4,836,258 | 4/1988 | Noble et al. | 369/109 |
| 4,873,680 | 10/1989 | Chung et al. | 369/58 |
| 4,930,115 | 5/1990 | Verboom et al. | 369/59 |
| 4,939,710 | 7/1990 | Fuji et al. | 369/124 |

*Primary Examiner*—Donald McElheny, Jr.
*Attorney, Agent, or Firm*—Wenderoth, Lind & Ponack

[57] ABSTRACT

An apparatus is provided for recording and/or reproducing video information and code data simultaneously on a video disc recording medium. The video information is recorded on the recording medium as FM-modulated carrier signals. The recording of such FM-modulated carrier signals is intermittently interrupted to record the code data. The interrupted or unrecorded portions of the otherwise recorded FM-modulated carrier signals is utilized to represent the video disc code data.

27 Claims, 8 Drawing Sheets

APPARATUS FOR RECORDING AND REPRODUCING CODE DATA FOR USE IN VIDEO DISC RECORDER

CROSS REFERENCE TO RELATED APPLICATIONS

The application is a divisional application of application Ser. No. 07/276,852, which was filed on Nov. 28, 1988 and which is now abandoned.

BACKGROUND OF THE INVENTION

The present invention relates to an apparatus for recording and reproducing code data in a video disc recorder operable to record on and reproduce from a disc-like recording medium video or audio information which is subjected to, for example, frequency-modulation.

An analog image file recorded on an optical disc may be rapidly and readily displayed on a television receiver using a small-scale image system, and such systems enjoy a wide application in many industrial fields, such as medical related fields.

In such systems, in addition to the analog image data, the recording and reproducing of code data are also necessary for disc management aspects.

There are two different types of video disc recorders. In one type (digital) of recorder the code data is digital-recorded and represented by a binary "1" or "0" depending on whether recorded pits occur or not, and in the other type (analog) of recorder the length and interval of the recorded pits are used as video information, which are analog-recorded. The discs which are used in these two type of recording systems have respectively different "preformat" structures of sectors and track addresses, and are thus incompatible with each other, making it difficult to realize a coexistence of the analog recording and the digital recording.

In this connection, an optical disc recorded for converting digital code data of a computer into analog signals and recording the latter has been proposed in an article entitled "A video/data mixed file system using the write-once optical video disc recorder", by Masutomi Ohta and Yoshihiro Yamada pages 541 to 544 of a publication of the television society Vol. 40, No. 6.

Such conventional methods are convenient in recording code data having a comparatively high recording density of information and a large information recording volume together with analog video information, but the system scale and expenses are excessive when the required code data has a relatively small information content, such as ID numbers of the disc.

SUMMARY OF THE INVENTION

The object of the present invention is to provide an inexpensive video disc recorder, for the purpose of solving the above-described problems, which is capable of recording code data having a comparatively small information content, such as the disc ID numbers, in association with analog video information.

For overcoming the conventional problems, the present invention has an arrangement constituted by a rotation reference detector for outputting rotation reference signals of a disc, a write clock generator for generating a write clock for writing data, a write shift register for outputting preset code data in synchronization with the write clock, a data setting unit for presetting the code data, a laser power control circuit for controlling the intensity of a laser power, an envelope detector circuit for determining whether or not the recording of video data occurs, a read clock generator for generating a read clock with reference to the rotation reference signals, and a read shift register for storing the information detected by the envelope detector circuit in synchronization with the read clock output from the read clock generator.

In accordance with the present invention, digital data can be reproduced by the steps of recording frequency-modulated analog video information intermittently in association with binary "1" and "0" digital information and detecting the envelope of the recorded FM signals, and data errors may be avoided by adjusting the response rate of the envelope detection and examining read values for a certain period of time when the data read operation takes place.

DETAILED DESCRIPTION OF THE INVENTION

An embodiment of the present invention with now be described.

Figure 1:
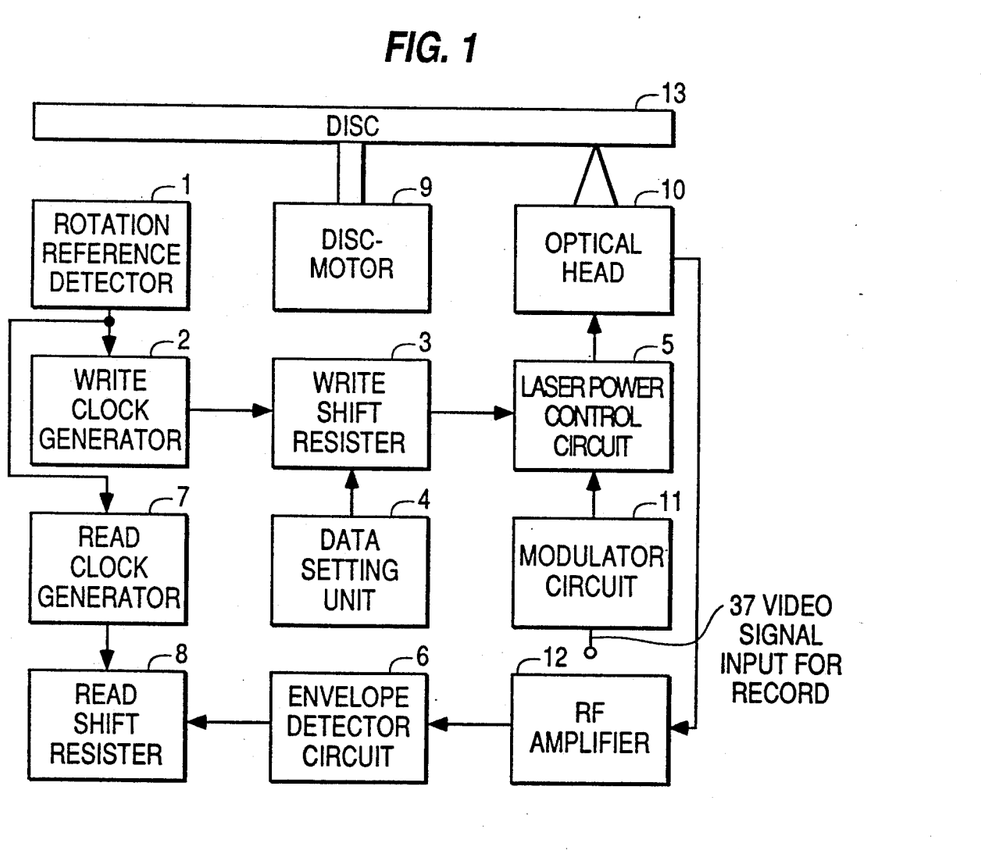
FIG. 1 is a block view showing the structure of an apparatus for recording and reproducing code data using a video disc recorder by way of example in accordance with the present invention.

Referring to FIG. 1, a rotation reference detector 1 detects a rotation reference of an optical disc 13 and outputs a rotation reference pulse to a write clock generator 2. The write clock generator 2 is triggered by the rotation reference pulse to periodically output write clock pulses for writing a number corresponding to the number of data bits. A write shift register 3 having code data present by a data setting unit 4 serially outputs in synchronization with the write clock the code data to a laser power control circuit 5 which is turned ON and OFF during recording of video information. Thus, the code data is registered on the disc 13 in the form of a recording or non-recording of the video information.

The code data thus written may be read in the following manner.

Video signals recorded on the disc 13, once detected by an optical head 10, are amplified by an RF amplifier 12, and transmitted to an envelope detector circuit 6 where the video signals are converted into binary logic information of 1's and 0's, depending on whether the video information occurs or not. A read shift register 8 is synchronized with the read clock output from a read clock generator 7 (the read clock being based on the rotation reference pulse) so as to serially store the binary logic information output from the envelope detector circuit 6 for further reading of the code data.

In accordance with the present invention, there is provided a video disc recorder in which code data may be readily recorded and reproduced using small-scale circuitry employing coding scheme which utilizes the recording and non-recording of video information.

The embodiment of the present invention will now be described in more detail.

Figure 2:
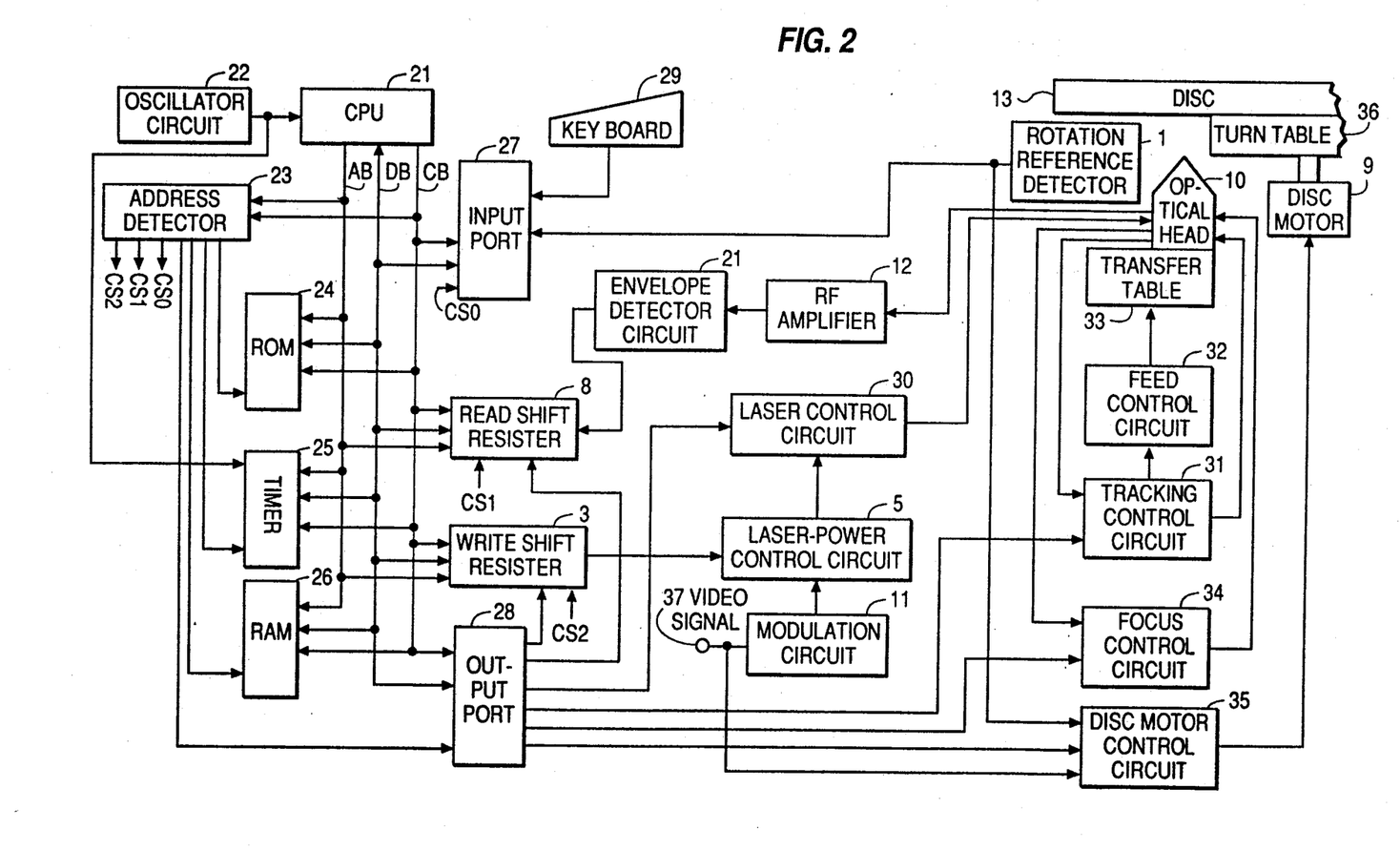
FIG. 2 is a block view showing a more concrete structure of the embodiment of FIG. 1.

Referring to FIG. 2, a central processing unit 21 (CPU) is adapted to interface with peripheral devices via an address bus AB, a data bus DB, and a control bus CB. An address decoder 34 decodes the contents of the address bus AB and generates a select signal for selection of one of the peripheral devices. A read-only memory 24 (ROM) has stored therein the control programs of the CPU 21. A random-access memory 24 (RAM) functions as a working data memory of the CPU 21.

An oscillator circuit 22 is adapted to impart to the CPU 21 a reference clock used when running programs.

A disc motor 9 is activated upon application of disc-motor drive instructions from the CPU 21 through an output port 28 to a disc-motor control circuit 35. The disc-motor control circuit 35 controls the disc motor 9 such that signals representing the rotation reference position which are prerecorded on the disc 13 placed in position on a turntable 36 are detected by the rotation reference detector 1 to maintain a constant phase difference between the rotation reference signals and vertical synchronization signals of the first field extracted from video signals at an image input terminal 37. A control is effected such that upon starting of the disc 13, a laser control circuit 30 is turned on, a focus control circuit 34 is actuated to establish the focus of the optical head 10 on the recording surface of the disc 13, and then a tracking control circuit 31 is actuated to cause the optical head 10 to scan through the information-registered track of the disc 13. A feed control circuit 32 serves to obtain from the tracking control circuit 31 information indicating that the optical head 10 is inclined radially relative to the disc 13, and to displace a transfer table 33 radially of the disc 13 to release the optical head 10 from the inclining position.

The code data to be written is supplied by the data setting unit 4 through an input port 27 from a key board 29, and the CPU 21 detects a write instruction key and then stores the written data in the write shift register 3. Subsequently, the CPU 21 outputs a write clock "b" by use of the clock generator 2 in the following manner. Upon detecting a disc rotation reference signal "a" from the rotation reference detector 1 via the input port 27, the CPU 21 will set a timer 25 at an initial value corresponding to the bit period so as to drive the timer 25, which will then count the reference clock from the oscillator circuit 22. The CPU 21 detects any overflow of the timer 25, outputting the write clock "b" via the output port 28 to the write register 3, and initializing the timer 25 once again. The CPU 21 repeats this operation by a number of times corresponding to the number of data written.

The write shift register 3 outputs to the laser power control circuit 5 the code data one bit at a time by use of the write clock "b". The laser power control circuit 5 changes the intensity of the laser power being produced in response to the binary information ("1" or "0") coming from the write shift register 3 so that the recording state (recording or non-recording) of video signals frequency-modulated by a modulation circuit 11 will be recorded on the information track of the disc 13. At this time, the servo gains of a focus control circuit 34 and tracking control circuit 31 may vary with the timing of the intensity of the laser power. In this embodiment, recording takes place when the output C of the write shift register 3 is "1", whereas the output C of the write shift register 3 is "0" at the time of storing of data and after the output of the entire data. In the case of the recording of normal images, the laser power control circuit 5 is controlled in synchronization with the rotation reference signal "a".

The code data recorded as above-described may be read as follows.

The frequency-modulated video signals which have been detected from the disc 13 by the optical head 10 are amplified by the RF amplifier 12 and detected by the envelope detector circuit 6 for conversion into either of the digits "1" or "0" depending on whether the video signals occur or not. If the CPU 21 detects any read instructions from the key board 29, it controls the tracking control circuit 31 so that the optical head 10 may scan the information tracks on which the code data are recorded. Then, the CPU 21 detects the rotation reference signals "a" and transmits after the lapse of a delay time, using the timer 25 as is the case with the write clock "b", read clock "d" by the number of times corresponding to the number of the data via the output port 28 to the read shift register 8.

The read shift register 8 is operative to take in binary data from the envelope detector circuit 6 one bit after another, and then, the CPU 21 reads via the data bus (DB) the reproduced code data from the read shift register 8. The delay time of the read clock "d" from the write clock "b" is set to be longer than the sum of the detection delay time of the envelop detector circuit 6 and the rise time of the laser in the data recording.

Figure 3:
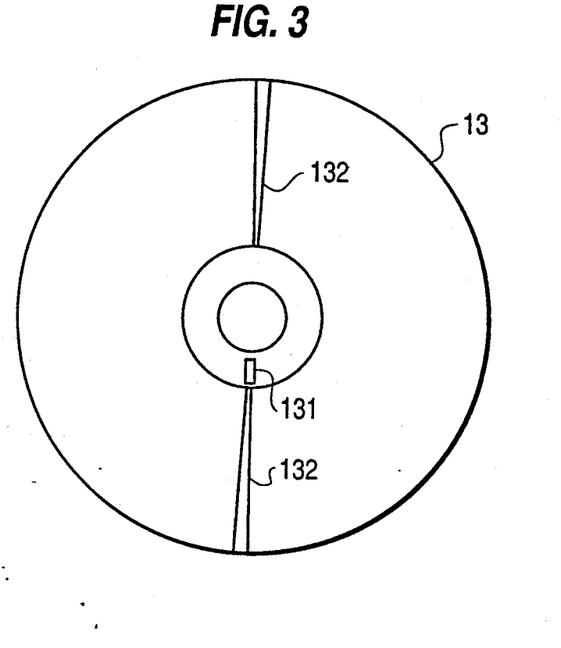
FIG. 3 is a plan view of a disc of the present embodiment.

FIG. 3 depicts the disc 13 used in the present embodiment, in which a rotation reference mark 131 is recorded within the mirror portion of the disc 13, the mark 131 having a different reflectance of light then that of the mirror portion. The address information 132 is prerecorded in the information tracks.

Figure 4:
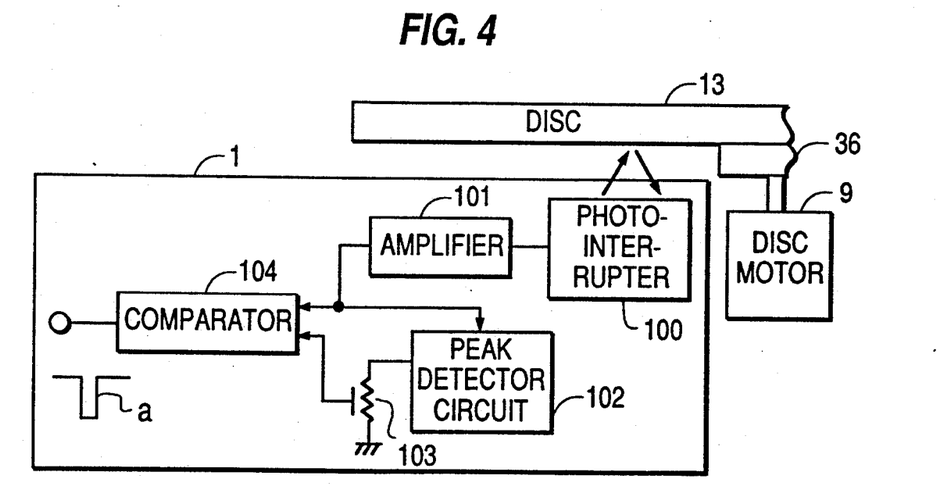
FIG. 4 is a block view showing a rotation reference detector circuit of the present embodiment.

FIG. 4 illustrates an embodiment of the rotation reference detector 1 which is adapted to detect the rotation reference mark 131 using a reflector type photointerrupter 100 responsive to the change of reflectance and further adapted to amplify detection signals using an amplifier 101. The output of the amplifier 101 is held at its peak value by a peak detector circuit 102. A comparator 104 compares detecting signals from the amplifier 101 with the voltage of the output signal from the peak detector circuit 102 as a threshold voltage and outputs a binary-coded rotation reference signal "a".

Figure 5:
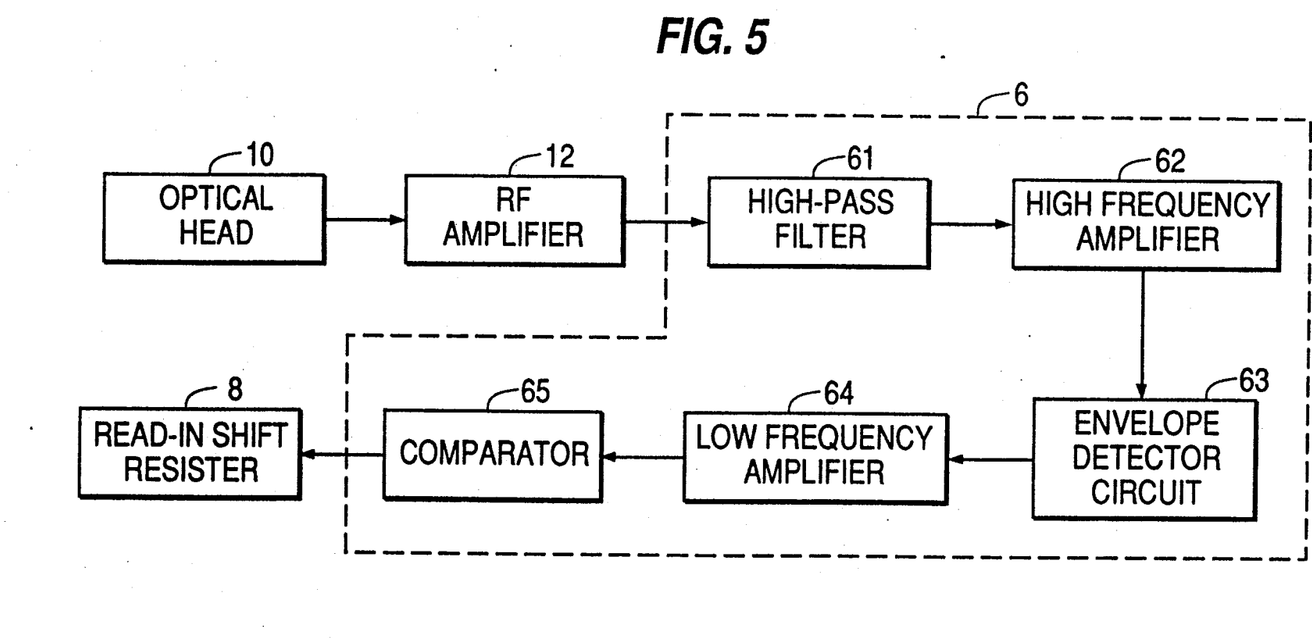
FIG. 5 is a block view of an envelope detector circuit of the present embodiment.

FIG. 5 depicts an embodiment of the envelope detector circuit 6, in which the signals detected by the optical head 10 are amplified by the RF amplifier 12 and then split using a high-pass filter (HPF) 61 away from the frequency-modulated video signal component, which is then amplified by a high-frequency amplifier 62 to a desired level with the consequential preparation of envelope signals by aid of an envelope detector circuit 63 constituted by a diode. The envelope signals are amplified by a low-frequency amplifier 64, and then, binary-coded by the comparator 65 and finally delivered to the read shift register 8.

Figure 6:
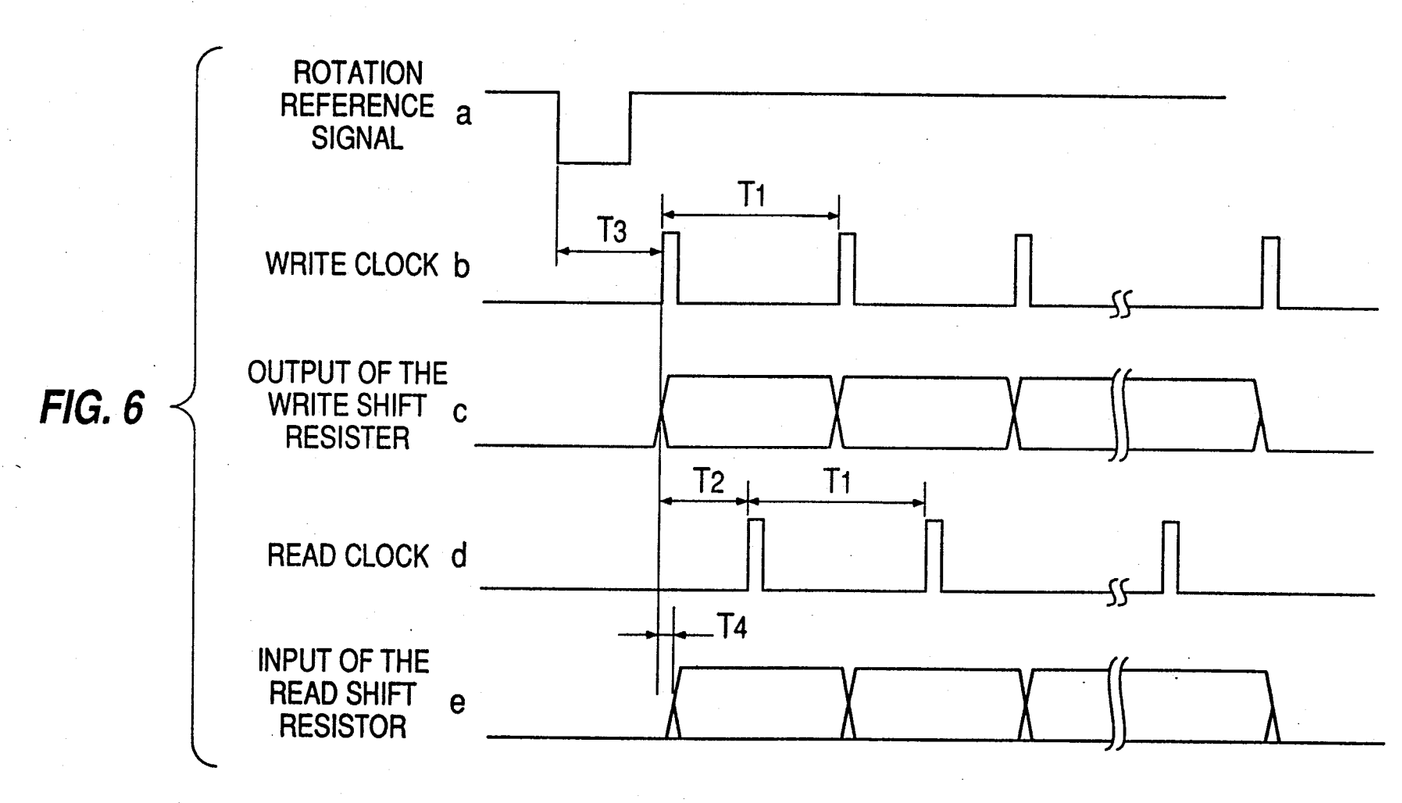
FIG. 6 is a timing chart of write and read operations of the present embodiment.

FIG. 6 depicts the timing of the rotation reference signal "a", write clock "b", the output "c" of the write shift register, read clock "d" and the input "e" of the read shift register. T1 is a bit period, T2 a delay time from the write clock "b" to the read clock "d", T3 a programmatic delay time from the production of rotation reference signal "a" to the output of write clock "b", and T4 is a sum of the detection delay time of the envelope detector circuit 6 and the rise time of the laser during the recording of data, wherein T1>T2>T4. Also, the write clock "b" has one more clock than the number of the data.

Figure 7:
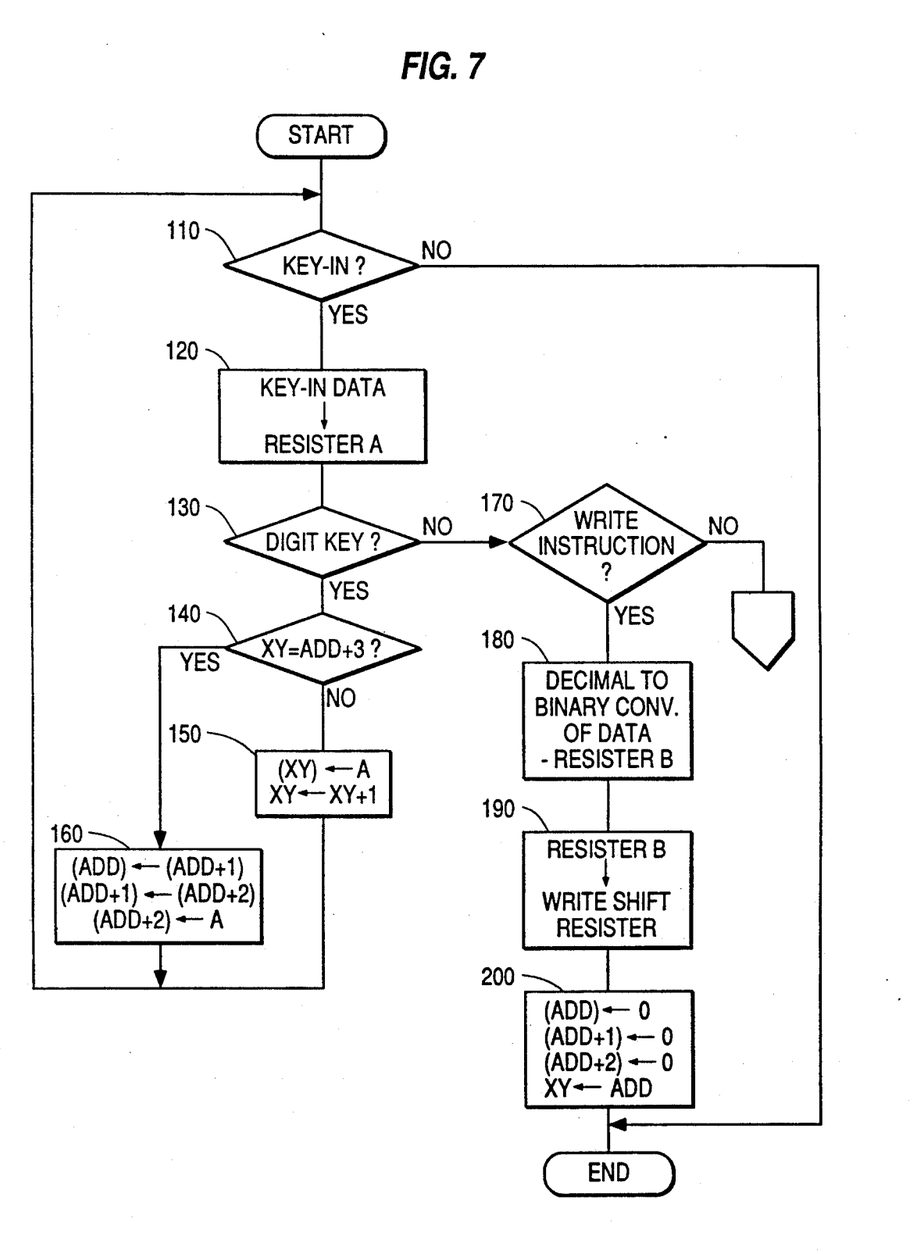
FIG. 7 is an operational flow chart of a data setting unit.

FIG. 7 depicts a flow chart embodying the data setting unit 4 in accordance with the present invention. A key input from a key board 29 is examined in STEP 110, and upon detection of the key input, the key input data is stored in a register A in STEP 120. In STEP 130, the digit key (ten-key) data carries out an inspection using the digit keys. STEPS 140 to 160 are applied to store key data sequentially from address ADD to address ADD+2. In the event of the inputting of keys other than the digit keys, the processing step jumps to STEP 170, and in the case of the write instruction key, in STEP 180 the data of a number of three figures from the address ADD to the address ADD+2 is processed for decimal to binary conversion, and in STEP 190, the decimal to binary converted data is stored in the write shift register 3. In STEP 200, the contents of the digit key stored address and the digit key stored memory are initialized.

Figure 8:
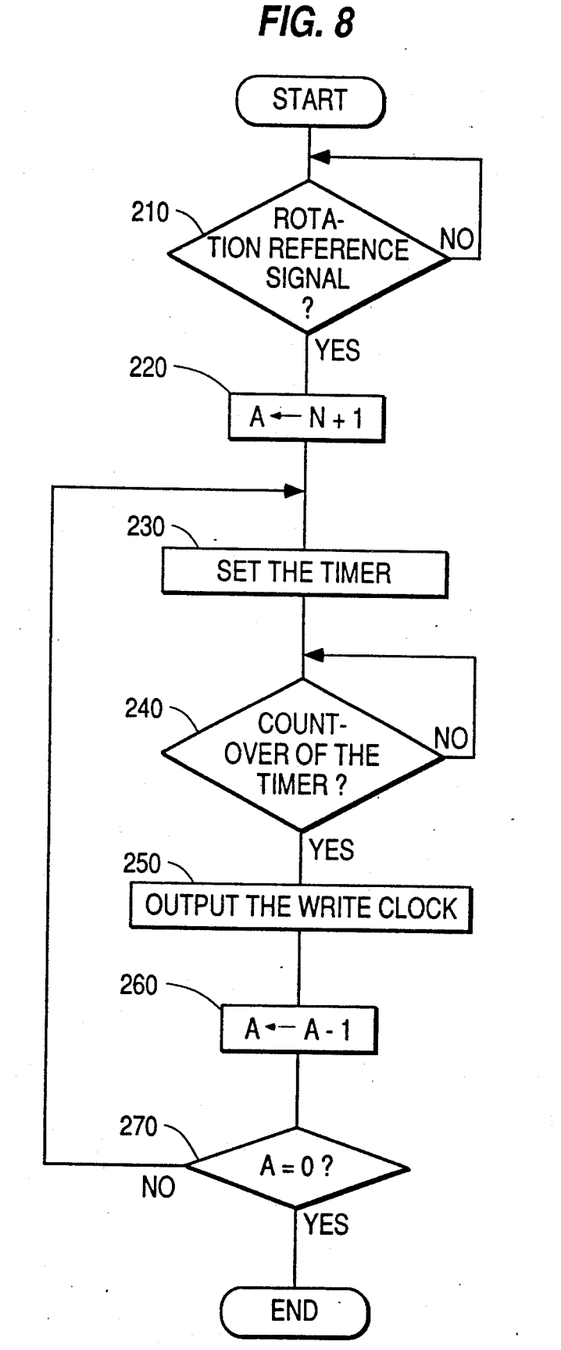
FIG. 8 is an operational flow chart of a write clock generator.

FIG. 8 shows a program embodying the write clock generator 2. In STEP 210, the leading edge of the rotation reference signal "a" is detected through the input port 27, and in STEP 220, the value of the number N of data bits plus 1 is stored as a number of the write clock in the register A. In STEP 230, the timer 25 is set at the value corresponding to a bit period in order to actuate the timer 25. In STEP 240, any count-over of the timer 25 is detected, and in STEP 250, clock pulses are outputted via the output port 28 to the write shift register 3 to update the written data. In STEP 260, the number of the write clock is counted down, and in STEP 270, if the write clock "b" has been found to be outputted by the set number, the program sequence for the generation of the write clock is complete. Otherwise, the sequence returns to STEP 230.

Figure 9:
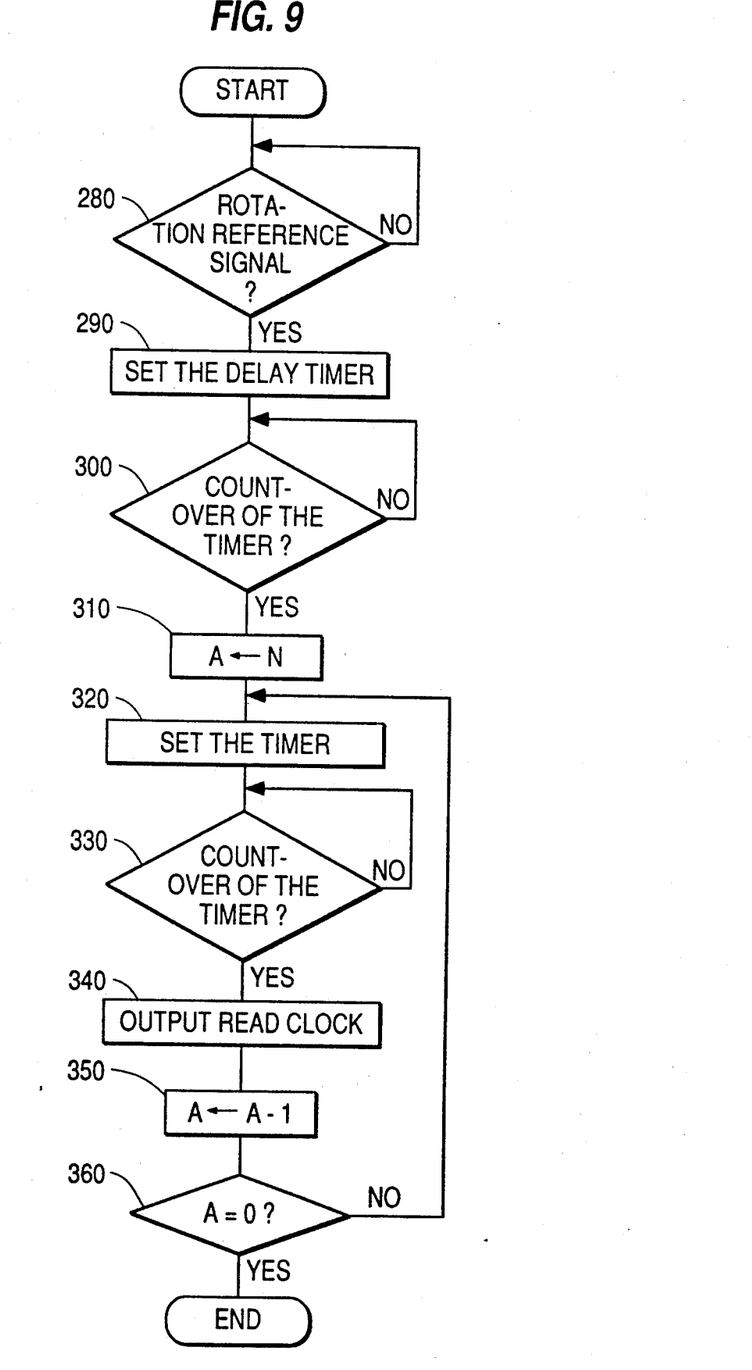
FIG. 9 is an operational flow chart of a read clock generator.

FIG. 9 depicts a flow chart embodying the read clock generator 7.

In STEP 280, the leading edge of the rotation reference signal "a" is detected through the input port 27, and in STEPS 290 and 300, the timer 25 is used to delay the output start timing of the read clock "d". In STEP 310, the number N of read data bits is stored in the register A, and in STEPS 320 and 330, a time interval is established for the portion of the data bit period to output read clock "d" in STEP 340. In STEPS 350 and 360, control is effected so as to output the read clock "d" by the set number.

As described above, in accordance with the present invention, a functional arrangement can be supplied reliably and inexpensively such that the digital data is reproduced by the steps of intermittently recording frequency-modulated analog video information based on either of the binary digits "1" and "0" of the digital data and detecting the envelope of the recorded FM signals. Data errors due to defects such as drop-out may be avoided by the adjustment of the response rate of envelope detection as well as the inspection of read values for a period of time when the data is read. Although the data recording density is low, no hardware is needed for error correction, and digital information such as ID numbers of a disc may be recorded and reproduced by adding simple hardware and software to a video disc recorder for recording frequency-modulated analog video information.

Furthermore, as for the video signals, there are provided free information tracks in the inner periphery of the disc due to the C/N limitation, and since the digital information signals according to the present invention requires less C/N and the best use the free information tracks may be provided, digital information can be recorded without decreasing the amount of video information.

What is claimed is:

1. A video disc apparatus comprising:
    video information recording means for recording a FM-modulated carrier signal denoting video information onto a video disc recording medium, the FM-modulated carrier signal having a carrier frequency; and,
    code data recording means for recording code data onto the video disc recording medium during recording of the video information by said video information recording means;
    said code data recording means including means for causing said video information recording means to intermittently interrupt the recording of the FM-modulated carrier signal in accordance with a binary representation of the code data;
    wherein a thus interrupted recording pattern of the recorded FM-modulated carrier signal is indicative of the binary representation of the code data.

2. A video disc apparatus as recited in claim 1, further comprising:
    video information reproducing means for reproducing from the video disc recording medium the FM-modulated carrier signal denoting the video information which has been recorded by said video information recording means; and,
    code data reproducing means for reproducing from the video disc recording medium the code data, which has been recorded by said code data recording means, during reproducing of the video information by said video information reproducing means;
    said code data reproducing means including means for detecting the interrupted recording pattern of the recorded FM-modulated carrier signal, and for determining the binary representation of the code data based on the thus detected interrupted recording pattern of the recorded FM-modulated carrier signal.

3. A video disc apparatus as recited in claim 1, said code data recording means further including:
    code data storing means for storing in advance the code data;
    write clock generator means for generating a write clock signal;
    write shift register means, coupled to said code data storing means and to said write clock generator means, for serially outputting the code data stored in the code data storing means at a frequency of said write clock signal;
    wherein the recording of the FM-modulated carrier signal by said video information recording medium is intermittently interrupted in accordance with the code data serially output by said write shift register means.

4. A video disc apparatus as recited in claim 2, said code data recording means further including:
- code data storing means for storing in advance the code data;
- write clock generator means for generating a write clock signal;
- write shift register means, coupled to said code data storing means and to said write clock generator means, for serially outputting the code data stored in the code data storing means at a frequency of said write clock signal;
- wherein the recording of the FM-modulated carrier signal by said video information recording medium is intermittently interrupted in accordance with the code data serially output by said write shift register means.

5. A video disc apparatus as recited in claim 3, further comprising means for detecting a rotational position of the video disc recording medium, wherein said write clock generator means is actuated in accordance with the detected rotational position of the video disc recording medium.

6. A video disc apparatus as recited in claim 4, further comprising means for detecting a rotational position of the video disc recording medium, wherein said write clock generator means is actuated in accordance with the detected rotational position of the video disc recording medium.

7. A video disc apparatus as recited in claim 2, said code data reproducing means further including:
- an envelop detecting means for detecting envelopes of the FM-modulated carrier signal reproduced by said video information reproducing means, and for outputting the binary representation of the recorded code data based on the detected envelopes of the FM-modulated carrier signal;
- read clock means for generating a read clock signal;
- read shift register means, coupled to said envelope detecting means and to said read clock means, for storing in synchronism with a frequency of the read clock signal the binary representation of the code data output by said envelope detecting means.

8. A video disc apparatus as recited in claim 4, said code data reproducing means further including:
- an envelop detecting means for detecting envelopes of the FM-modulated carrier signal reproduced by said video information reproducing means, and for outputting the binary representation of the recorded code data based on the detected envelopes of the FM-modulated carrier signal;
- read clock means for generating a read clock signal;
- read shift register means, coupled to said envelope detecting means and to said read clock means, for storing in synchronism with a frequency of the read clock signal the binary representation of the code data output by said envelope detecting means.

9. A video disc apparatus as recited in claim 6, said code data reproducing means further including:
- an envelop detecting means for detecting envelopes of the FM-modulated carrier signal reproduced by said video information reproducing means, and for outputting the binary representation of the recorded code data based on the detected envelopes of the FM-modulated carrier signal;
- read clock means for generating a read clock signal;
- read shift register means, coupled to said envelope detecting means and to said read clock means, for storing in synchronism with a frequency of the read clock signal the binary representation of the code data output by said envelope detecting means.

10. A video disc apparatus as recited in claim 7, wherein the frequency of the write clock signal and the frequency of the read clock signal are the same, and wherein each clock pulse of the read clock signal is delayed relative to each clock pulse of the write clock signal.

11. A video disc apparatus as recited in claim 8, wherein the frequency of the write clock signal and the frequency of the read clock signal are the same, and wherein each clock pulse of the read clock signal is delayed relative to each clock pulse of the write clock signal.

12. A video disc apparatus as recited in claim 9, wherein the frequency of the write clock signal and the frequency of the read clock signal are the same, and wherein each clock pulse of the read clock signal is delayed relative to each clock pulse of the write clock signal.

13. A video disc apparatus comprising:
- video information reproducing means for reproducing a FM-modulated carrier signal denoting video information which has been recorded on a video disc recording medium; and,
- code data reproducing means for reproducing code data recorded on the video disc recording medium during reproducing of the video information by said video information reproducing means;
- said code data reproducing means including means for detecting and differentiating between recorded portions and unrecorded portions of the FM-modulated carrier signal, and for determining a binary representation of the code data based on the thus differentiated recorded and unrecorded portions of the FM-modulated carrier signal.

14. A video disc apparatus as recited in claim 13, said code data reproducing means further including:
- an envelop detecting means for detecting envelopes of the FM-modulated carrier signal reproduced by said video information reproducing means, and for outputting the binary representation of the recorded code data based on the detecting envelopes of the FM-modulated carrier signal;
- read clock means for generating a read clock signal;
- read shift register means, coupled to said envelope detecting means and to said read clock means, for storing in synchronism with a frequency of the read clock signal the binary representation of the code data output by said envelope detecting means.

15. A video disc apparatus as recited in claim 1, wherein a frequency in which said video information recording means intermittently interrupts the recording of the FM-modulated carrier signal is at least several times lower than the carrier frequency.

16. A video disc apparatus as recited in claim 2, wherein a frequency in which said video information recording means intermittently interrupts the recording of the FM-modulated carrier signal is at least several times lower than the carrier frequency.

17. A video disc apparatus as recited in claim 3, wherein the frequency of the write clock signal is at least several times lower than the carrier frequency.

18. A video disc apparatus as recited in claim 4, wherein the frequency of the write clock signal is at least several times lower than the carrier frequency.

19. A video disc apparatus as recited in claim 5, wherein the frequency of the write clock signal is at least several times lower than the carrier frequency.

20. A video disc apparatus as recited in claim 6, wherein the frequency of the write clock signal is at least several times lower than the carrier frequency.

21. A video disc apparatus as recited in claim 7, wherein the frequency of the read clock signal is at least several times lower than the carrier frequency.

22. A video disc apparatus as recited in claim 8, wherein the frequency of the read clock signal is at least several times lower than the carrier frequency.

23. A video disc apparatus as recited in claim 9, wherein the frequency of the read clock signal is at least several times lower than the carrier frequency.

24. A video disc apparatus as recited in claim 10, wherein the frequency of the read clock signal is at least several times lower than the carrier frequency.

25. A video disc apparatus as recited in claim 11, wherein the frequency of the read clock signal is at least several times lower than the carrier frequency.

26. A video disc apparatus as recited in claim 12, wherein the frequency of the read clock signal is at least several times lower than the carrier frequency.

27. A video disc apparatus as recited in claim 14, wherein the frequency of the read clock signal is at least several times lower than the carrier frequency.

* * * * *